US006896792B2

(12) United States Patent
St-Pierre et al.

(10) Patent No.: US 6,896,792 B2
(45) Date of Patent: May 24, 2005

(54) METHOD AND DEVICE FOR IMPROVED CATALYTIC ACTIVITY IN THE PURIFICATION OF FLUIDS

(75) Inventors: Jean St-Pierre, Vancouver (CA); David P. Wilkinson, North Vancouver (CA); Stephen A. Campbell, Maple Ridge (CA)

(73) Assignee: Ballard Power Systems Inc., Burnaby (CA)

( * ) Notice: Subject to any disclaimer, the term of this patent is extended or adjusted under 35 U.S.C. 154(b) by 493 days.

(21) Appl. No.: 10/167,063

(22) Filed: Jun. 11, 2002

(65) Prior Publication Data

US 2003/0010629 A1 Jan. 16, 2003

Related U.S. Application Data

(60) Provisional application No. 60/298,337, filed on Jun. 13, 2001.

(51) Int. Cl.[7] .............................................. C25D 17/00
(52) U.S. Cl. ....................... 205/763; 205/765; 204/252; 204/265; 204/266; 429/12
(58) Field of Search ................................ 205/763, 765; 204/252, 265, 266; 429/12

(56) References Cited

U.S. PATENT DOCUMENTS

| 4,910,999 A | | 3/1990 | Eaton ........................... 73/61.2 |
| 6,245,214 B1 | * | 6/2001 | Rehg et al. .................. 205/764 |
| 2002/0164507 A1 | | 11/2002 | Ding et al. .................... 429/21 |

FOREIGN PATENT DOCUMENTS

| DE | 196 15 562 C1 | 10/1997 |
| JP | 02 311302 | 12/1990 |
| WO | WO 00/16880 | 3/2000 |

OTHER PUBLICATIONS

English abstract and machine translation of DE 196 15 562, German text from esp@cenet, ep.espacenet.com, Sep. 10, 1997.

English abstract of JP 02 311302, esp@cenet, ep.espacenet.com, Dec. 26, 1990.

Merimadi et al., "Low–Temperature Hydrogen Production Using Electrically Activated Catalysts," *ChemComm* :1875–1876, 2000.

Tsiplakides et al., "Nonfarada Electrochemical Modification of The Catalytic Activity of Pt–Black Electrodes Deposited on Nafion 117 Solid Polymer Electrolytes," *Journal of the Electrochemical Society* 144(6):2072–2078, Jun. 1997.

Vayenas et al., "The Electrochemical Activation of Catalytic Reactions," in John O'M Bockris et al. (ed.), *Modern Aspects of Electrochemistry No. 29*, Chapter 2, Plenum Press, New York, 1996, pp. 57–202.

* cited by examiner

Primary Examiner—Arun S. Phasge
(74) Attorney, Agent, or Firm—Seed IP Law Group PLLC

(57) ABSTRACT

The activity of catalysts used in promoting the oxidation of certain oxidizable species in fluids can be enhanced via electrochemical methods, e.g., NEMCA. In particular, the activity of catalysts used in the selective oxidation of carbon monoxide can be enhanced. A purification system that exploits this effect is useful in purifying reformate supplied as fuel to a solid polymer electrolyte fuel cell stack. The purification system comprises an electrolytic cell with fluid diffusion electrodes. The activity of catalyst incorporated in the cell anode is enhanced.

39 Claims, 5 Drawing Sheets

METHOD AND DEVICE FOR IMPROVED CATALYTIC ACTIVITY IN THE PURIFICATION OF FLUIDS

CROSS-REFERENCE TO RELATED APPLICATION

This application claims the benefit of U.S. Provisional Patent Application No. 60/298,337 filed Jun. 13, 2001, now abandoned, which application is incorporated herein by reference in its entirety.

BACKGROUND OF THE INVENTION

1. Field of the Invention

The present invention relates to purifying fluids using an electrolytic cell and particularly to purifying fuels for use in fuel cell systems.

2. Description of the Related Art

Catalysts are employed in various commercial and industrial applications to increase chemical reaction rates and are frequently used in the purification of various fluids (e.g., in removing pollutants from the exhaust from automobiles). Electrocatalysts are catalyst materials that increase the rate of the half cell reactions that occur at an electrode in an electrochemical cell. Often, a given material may serve as a catalyst material for many different chemical and/or electrode reactions (e.g., platinum). Herein, the term catalyst will be used specifically in reference to a chemical reaction, as opposed to an electrode or half cell reaction, while the term electrocatalyst will be used in reference to an electrode reaction.

Recently, it has been noticed that the activity of certain catalysts can be enhanced using electrochemical methods known as nonfaradaic electrochemical modification of catalytic activity (NEMCA) or electrochemical promotion (EP). The activity of such catalysts can be increased substantially by incorporating them in the vicinity of an electrode in an appropriate electrochemical cell and then operating the electrochemical cell. Further, the selectivity of such catalysts may be significantly altered (i.e., the relative rates at which competing reactions occur at the catalyst may be significantly changed too). It is hypothesized that catalyst activity/selectivity is promoted by the presence or spillover of certain promoting ionic species generated during the operation of the electrochemical cell.

It has also been noticed that the activity of certain catalysts can be enhanced by electrical activation methods, for instance by passing an appropriate electrical current through the catalyst. Again, the use of such methods can increase the activity of such catalysts substantially. The reasons for such enhancement are not fully understood but may relate in part to the effects of resistive heating of the catalyst (e.g., from heat treatment or localized increases in temperature).

Generally, it is desirable to be able to enhance catalyst activity since such materials typically are in short supply and thus are expensive. In applications where competing reactions can take place, it is also generally desirable to enhance the selectivity of the catalyst for the desired reaction. An exemplary application is the selective oxidation of carbon monoxide.

Carbon monoxide is an undesirable impurity found in the fuel supply or processed fuel contemplated for use in certain fuel cell systems. While high temperature fuel cell types such as the solid oxide or molten carbonate systems can tolerate relatively high levels of CO, low temperature fuel cell types such as the phosphoric acid or solid polymer electrolyte systems are sensitive to CO in the fuel. In solid polymer electrolyte fuel cells in particular, the presence of CO at levels of order of 10 ppm or higher can poison the typical catalyst used in the fuel cell anodes and adversely affect fuel cell performance.

Pure hydrogen gas is a preferred fuel for solid polymer electrolyte fuel cell systems, but is presently difficult to store and handle. Thus, instead of pure hydrogen, a more readily stored and handled hydrocarbon fluid (e.g., methane or methanol) is often used as a fuel supply. The hydrocarbon fuel supply is then chemically processed or reformed to generate hydrogen on demand for the fuel cell system. The processed fuel or reformate typically contains significant quantities of other by-products though along with hydrogen. For instance, methanol reformate obtained via the steam reformation of methanol typically contains about 65% to about 75% hydrogen, about 10% to about 25% carbon dioxide, and from about 0.5% to about 20% by volume of CO, all on a dry basis and, in addition, also contains water vapor. The reformate is thus typically processed further to reduce the CO content. A water/gas shift reactor (a chemical reactor employing catalysts) may be used to react CO impurity with water (producing carbon dioxide and hydrogen) thereby reducing the CO content to about 0.2%–2% by volume, on a dry basis. Then, a selective oxidizer unit (another chemical reactor employing catalysts) may be used to selectively react remaining CO with a small amount of injected oxygen (producing carbon dioxide) and thereby further reduce the CO level. However, the selectivity of such a unit is typically not so high and thus a significant excess of oxygen is needed to oxidize the CO impurity. This excess oxygen can instead react with the fuel itself, representing a loss and inefficiency. Even after such additional treatment, the remaining CO level in the reformate stream may still be undesirably high. Further, the additional processing equipment increases system complexity and adds to its weight, size, and cost.

Other methods have been suggested in the art for reducing the CO levels in reformate. For instance, pressure swing adsorption and membrane filtration methods have been contemplated. Additionally, several methods employing electrochemical processes and electrolytic cells have been suggested in the prior art. In WO 00/16880, a technique is disclosed in which CO is removed from a reformate stream via chemisorption on the anode material of an electrochemical cell. The cell is regenerated from time to time in order to remove chemisorbed CO thereby avoiding saturation of the anode material. The regeneration involves an electrochemical process and can be performed using the cell in either electrolytic or galvanic mode. Alternatively, an electrochemical cell with a proton conducting membrane may be employed as a "hydrogen filter" to produce a CO-free fuel stream from reformate. Operating electrolytically, hydrogen in the reformate may be oxidized at the anode, transported as hydrogen ions through the electrolyte to the cathode, and then reduced back to hydrogen gas at the cathode (i.e., hydrogen is electrochemically pumped across the membrane). The hydrogen obtained from the cathode is thus free of the CO and other impurities in the reformate. However, this process is quite energy intensive and thus may not be a suitably efficient method for practical fuel cell systems.

While many approaches have been investigated for reducing the CO levels in reformed fuel for use in fuel cell systems, there is still a demand for more efficient and less complex methods.

BRIEF SUMMARY OF THE INVENTION

It has been discovered that the activity of catalysts for the selective oxidation of CO can be enhanced using electrochemical methods (e.g., NEMCA). In the examples to follow, rate enhancements in activity have been achieved for certain catalyst embodiments that are up to 40 times more than usual. Similar benefits may therefore be expected for similar catalyst embodiments in the oxidation of other oxidizable species (e.g,. methanol and the like).

Catalyst activity enhancement can be achieved and exploited in a purification system that suitably incorporates the catalyst in an electrolytic cell having fluid diffusion electrodes. The purification system is used to purify a gaseous or liquid fluid supply comprising a major component (e.g., fuel) and an oxidizable impurity (e.g., CO or methanol) using the catalyst to selectively promote the reaction of the oxidizable impurity with an amount of supplied oxidant (e.g., oxygen). The reaction rate at the catalyst is enhanced by operating the electrolytic cell.

The electrolytic cell comprises a fluid diffusion cathode, an electrolyte, and a fluid diffusion anode. The anode comprises the catalyst and an electrocatalyst. The electrolytic cell has a fluid supply inlet port to which the fluid supply is connected and a purified fluid outlet port from which purified fluid is obtained. The fluid supply inlet port and purified fluid outlet port are fluidly connected to the anode inlet and anode outlet respectively. An oxidant supply is also fluidly connected to the fluid supply inlet port. A power supply is electrically connected to the cell for electrolytic operation (i.e., with positive and negative terminals connected to the anode and cathode respectively).

A solid polymer electrolyte cell is suitable for use as the electrolytic cell. Conventional electrolytes may be employed such as perfluorosulfonic acid ionomer. Conventional electrodes that are suitable for hydrogen reduction may be employed as the cathode. The anode may comprise a fluid diffusion substrate (e.g., non woven carbon fibre paper), a catalyst layer comprising the catalyst that is applied on the substrate, and an electrocatalyst layer comprising the electrocatalyst that is applied onto the catalyst layer.

A preferred anode for enhancing the selective oxidation rate of CO employs carbon supported platinum-ruthenium catalyst and perfluorosulfonic acid ionomer in an electrocatalyst layer and carbon supported platinum catalyst and polytetrafluoroethylene binder in a catalyst layer. However, in certain embodiments the catalyst and the electrocatalyst may be the same. While a given material may act as both a catalyst and an electrocatalyst, in order to function as an electrocatalyst, the material must be ionically connected to the electrolyte in the electrolytic cell.

The purification system is useful in the purification of various fluid streams but is particularly useful in the purification of reformate for use as the fuel in a fuel cell system. Gaseous hydrogen is the major component in reformate and the oxidizable impurities include carbon monoxide and methanol. A reformate fluid supply may also include water. When the purification system is used as part of a fuel cell system, the fuel supply is fluidly connected to the fluid supply inlet port of the electrolytic cell and the purified fluid outlet port is fluidly connected to the fuel inlet of the fuel cell.

When using the electrolytic cell to purify a hydrogen stream, hydrogen gas may be generated electrochemically at the cathode (as hydrogen ions may be transported across the electrolyte and reduced at the cathode to form hydrogen gas). This hydrogen gas may also be employed as fuel for a fuel cell, along with any purified reformate, by collecting it from the cathode outlet and combining it with the purified reformats obtained from the anode outlet. Thus, the purification system may additionally comprise a fluid connection between the cathode outlet and the purified fluid outlet port. Further, the anode outlet may optionally be fluidly connected to the cathode inlet, thus directing the purified reformate through the cathode flow field and then out through the purified fluid outlet port. For purposes of purging the cathode, the purification system may additionally comprise a purge valve that is fluidly connected to the cathode. For greater capacity, a purification system may advantageously comprise a plurality of such electrolytic cells in a series stack. In such a case, a preferred embodiment employs porous bipolar flow field plates.

Operating the electrolytic cell by applying a voltage thereto causes certain electrochemical reactions to occur within and can enhance the activity of the catalyst. In an electrolytic cell, an electric potential is applied such that the anode is positive with respect to the cathode. For purposes of enhancing the selective oxidation activity of certain catalysts for CO, the power supply voltage is preferably set at greater than about 0.6 volts. The method is suitable for use in purifying fluids comprising less than about 1% carbon monoxide. The oxidant directed to the anode inlet may be oxygen and the required amount of oxygen may be less than about 0.5% of the volume of the fluid.

To enhance the activity of the catalyst and hence the reaction rate of the oxidizable impurity at the catalyst, the electrolytic cell may be operated continuously by applying an electric potential continuously thereto. Alternatively, the electric potential may be applied periodically. Typically however, the electric potential would be applied for periods greater than 100 seconds. In between applications of an electric potential, a load may be applied across the electrolytic cell.

Although the instant purification system requires a modest input of electricity, it can advantageously operate at much lower temperatures (e.g., less than about 150° C.) than prior art chemical reactors, such as a water/gas shift reactor (typically operating between 200° C. and 370° C.) or a selective oxidizer reactor (typically operating between 150° C. and 200° C.).

DETAILED DESCRIPTION OF THE INVENTION

Figure 1:
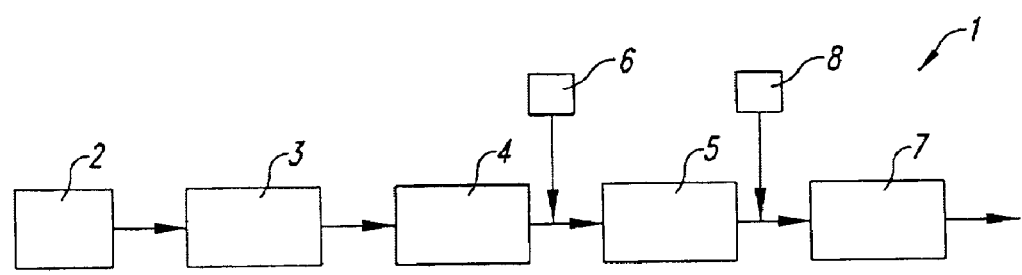
FIG. 1 is a schematic diagram of a prior art fuel cell system comprising a water/gas shift reactor and a selective oxidizer for removing CO from the fuel stream supplied to the fuel cell.

A preferred use for the purification system of the invention is in the removal of carbon monoxide from reformate such that the reformate is suitable for use as fuel in a solid polymer electrolyte (SPE) fuel cell system. FIG. 1 shows a schematic diagram of a conventional SPE fuel cell system 1 employing a water/gas shift reactor and a selective oxidizer to remove CO from reformate. Therein, a fuel supply 2 (typically methanol or methane) is directed to a reformer 3 that processes the fuel into hydrogen, carbon monoxide, and other gases. The processed fuel or reformate is directed to water/gas shift reactor 4 in which some of the CO impurity is chemically reacted away with water (the water for this reaction being typically present in the reformate). The output of water/gas shift reactor 4 is then directed to selective oxidizer 5 in which more CO impurity is reacted away with an amount of injected oxygen. The oxygen for this reaction is typically provided by introducing a controlled amount of air 6 into the output of water/gas shift reactor 4 upstream of selective oxidizer 5. The output of selective oxidizer 5 is then directed to the fuel inlet of SPE fuel cell stack 7. Even though a substantial amount of CO is removed using water/gas shift reactor 4 and selective oxidizer 5, the amount of CO remaining in the stream directed to fuel cell stack 7 may still be undesirably high. Often therefore, remaining CO is reacted away with oxygen within fuel cell stack 7 itself, for instance via introducing a small amount of oxygen into the fuel stream supplied to the stack 7 (as disclosed in U.S. Pat. No. 4,910,999). Again, the oxygen for this internal reaction is typically provided by introducing a controlled amount of air 8 into the output of selective oxidizer 5 upstream of stack 7.

Figure 2:
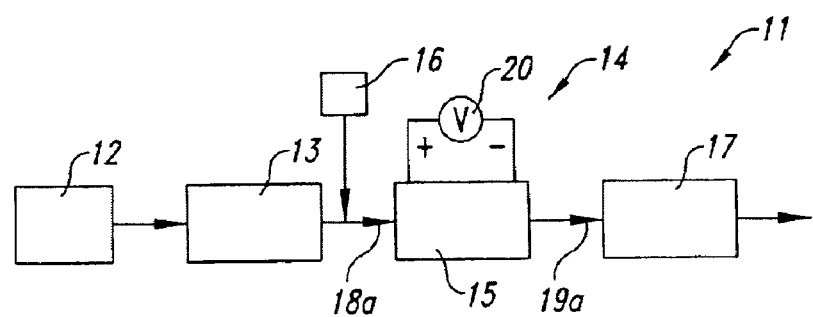
FIG. 2 is a schematic diagram of a fuel cell system comprising an electrolytic cell for removing CO from the fuel stream supplied to the fuel cell.

FIG. 2 shows a similar SPE fuel cell system 11 in which purification system 14 alone is used to remove CO. Purification system 14 comprises electrolytic cell 15, a supply of air 16, and power supply 20. Again, fuel supply 12 is directed to fuel processor 13, which comprises a reformer and optionally a selective oxidizer. Reformate from fuel processor 13 and a controlled amount of air from air supply 16 are combined and directed to fuel supply inlet port 18a of electrolytic cell 15. (Fuel supply inlet port 18a in turn is fluidly connected to anode inlet port 18, which is not shown in FIG. 2.) The positive and negative terminals of power supply 20 are connected to the anode and cathode of electrolytic cell 15 respectively and cell 15 is operated in electrolytic mode. CO is removed via the chemical and electrochemical reactions that occur at the anode of cell 15. The purified reformate is then exhausted from purified fluid outlet port 19a and directed to the fuel inlet of SPE stack 17. (Purified fuel outlet port 19a in turn is fluidly connected to anode outlet port 19, which is not shown in FIG. 2.)

Figure 3:
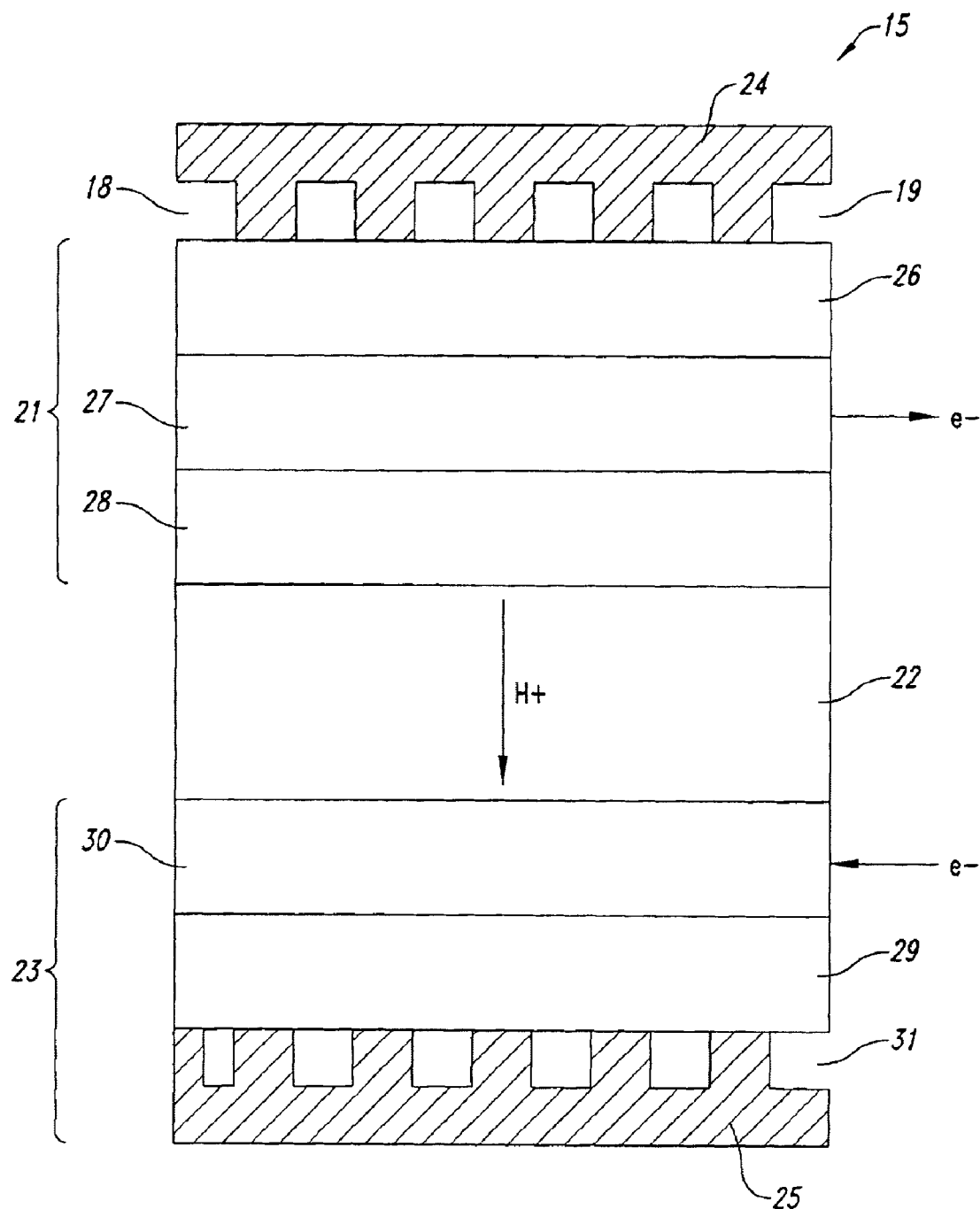
FIG. 3 shows a schematic diagram of the construction of a solid polymer electrolyte electrolytic cell and the chemical and electrochemical reactions that may take place therein when purifying methanol reformate.

The construction of electrolytic cell 15 is similar in many ways to that of a conventional solid polymer fuel cell. FIG. 3 shows a schematic diagram of the construction of electrolytic cell 15 and also depicts the chemical and electrochemical reactions that may take place therein when purifying methanol reformate. Cell 15 comprises a gas diffusion anode 21, a solid polymer electrolyte 22, a gas diffusion cathode 23, an anode flow field plate 24, and a cathode flow field plate 25. Anode 21 comprises a porous, electrically conductive substrate 26 that acts as a gas diffusion layer for distributing reactants to anode catalyst 27 and electrocatalyst 28. As shown in FIG. 3, anode catalyst 27 is applied in a layer on substrate 26 and anode electrocatalyst 28 is applied in a layer on catalyst layer 27. Cathode 23 also comprises a substrate 29 and electrocatalyst 30 applied in a layer on substrate 29. Anode 21, electrolyte 22, and cathode 23 are typically bonded together to form a membrane electrode assembly. A voltage is applied across the electrode terminals using the power supply (not shown) such that anode 21 is positive with respect to cathode 23, typically at 0.6 volts or more.

Reformate and a controlled amount of air are directed into anode inlet port 18 and through channels formed in anode flow field plate 24. The reformate and the amount of air diffuse and get distributed throughout anode 21 whereupon a variety of reactions may take place. At catalyst 27, the following chemical reactions may occur:

$$CO + \tfrac{1}{2}O_2 \rightarrow CO_2 \qquad\qquad 1)$$

$$H_2 + \tfrac{1}{2}O_2 \rightarrow H_2O \qquad\qquad 2)$$

Reaction 1), in which CO impurity is reacted with admitted oxygen, is a desired reaction and is enhanced by the appropriate construction and operation of electrolytic cell 15. Reaction 2) is unfavorable since it consumes hydrogen that could otherwise be gainfully used as fuel in the SPE fuel cell stack. Preferably therefore, the rate of reaction 1) is enhanced without similarly enhancing the rate of reaction 2).

At electrocatalyst 28, the aforementioned chemical reactions 1) and 2) may also occur to some extent. Additionally however, the following oxidation reactions may occur:

$$CO + H_2O \rightarrow CO_2 + 2H^+ + 2e^- \qquad\qquad 3)$$

$$CH_3OH + H_2O \rightarrow CO_2 + 6H^+ + 6e^- \qquad\qquad 4)$$

$$H_2 \rightarrow 2H^+ + 2e^- \qquad\qquad 5)$$

Reactions 3) and 4), in which CO impurity and methanol respectively are reacted with water, are desired reactions. (Methanol can appear in the reformate as a result of incomplete reformation of the fuel and may be used directly as a fuel in certain SPE fuel cell stacks. However, fuel cell performance is typically much better on hydrogen than directly on methanol and thus conversion of methanol to hydrogen is desirable.) In reaction 5), hydrogen is consumed at anode 21 but can later be captured at cathode 28 as described below. Thus, reaction 5) does not lead to a net loss of hydrogen fuel. However, reaction 5) is unfavorable nonetheless because energy is undesirably expended in pumping this hydrogen from anode to cathode.

Within the voltage stability window of cell 15, the associated reduction reactions that may occur are the following:

$$\tfrac{1}{2}O_2 + 2H^+ + 2e^- \rightarrow H_2O \qquad\qquad 6)$$

$$2H^+ + 2e^- \rightarrow H_2 \qquad\qquad 7)$$

Reduction reaction 6) may proceed at electrocatalyst 28 in anode 21 if the applied voltage from the power supply is below about 1.2V. (Water could be electrolyzed at greater applied voltages.) While reaction 6) involves no net expenditure of energy (since protons and electrons are both generated and consumed, along with oxygen, at electrocatalyst 28 ), reaction 6) is undesirable because it consumes oxygen intended for the removal of CO (via reaction 1)). Reaction 7) takes place at the cathode electrocatalyst 30. Protons generated at anode electrocatalyst 28 via reactions 3), 4) or 5) migrate through proton conducting electrolyte 22 to combine with electrons from the power supply.

The choice of materials and their location in the anode are important considerations in order to obtain enhanced activity from catalyst 27 without also unacceptably increasing the rate of unwanted reactions as well. Catalyst 27 may be a high activity metal black, an alloy or a supported metal catalyst, for example, platinum on carbon. The latter typically have relatively high catalyst surface area and are thus preferred. The catalyst layer applied to substrate 26 may also contain a binder, such as polytetrafluoroethylene. Electrocatalyst 28 may also be a high activity metal black, an alloy or a supported metal catalyst and may be a more CO-tolerant composition such as a platinum-ruthenium mixture. To improve transport of protons generated at electrocatalyst 28 to electrolyte 22, the electrocatalyst layer typically contains a proton conducting ionomer. The materials used for the catalyst and electrocatalyst may be the same. However without an ionic path to the electrolyte to carry away protons generated at the surface, a material can function as a catalyst but not an electrocatalyst.

Without being bound by theory, hydrogen ions or protons generated at electrocatalyst 28 may spillover into the region occupied by catalyst 27. It is these backspilled protons that may act as a doping agent thereby modifying the intrinsic activity of catalyst 27. Thus, catalyst 27 and electrocatalyst 28 may preferably be in close proximity. The electrocatalyst may preferably be located at the interface between the anode and the adjacent electrolyte in order to reduce the path length that generated protons must travel to reach the electrolyte.

The selection of the cathode electrocatalyst selection is not as critical. A highly active cathode electrocatalyst is not so important since the current density requirement is relatively low. A relatively inexpensive non noble metal catalyst that is not sensitive to CO (thereby allowing purging of the cathode with unprocessed fuel) may thus be preferred.

In operating the electrolytic cell, the voltage applied by the power supply is selected to be within the stability window of the cell components. The current draw from the power supply is relatively low. Further, it may not be necessary to operate the electrolytic cell continuously in order to obtain enhanced activity at catalyst 27. Backspilled, doping protons may be sufficiently stable (like the catalyst itself, they are not a reactant in reaction 1)) that catalyst activity may remain enhanced for periods following operation of the electrolytic cell.

A purified stream in which CO has been removed is obtained from anode outlet port 19. This purified stream is acceptable for use as the fuel for a SPE fuel cell stack but may still contain significant amounts of water or carbon dioxide. Pure hydrogen is generated at cathode 23 and, along with any water that permeates electrolyte 22, is obtained at cathode outlet port 31 and can also be used as fuel for the SPE fuel cell stack.

Figure 4B:
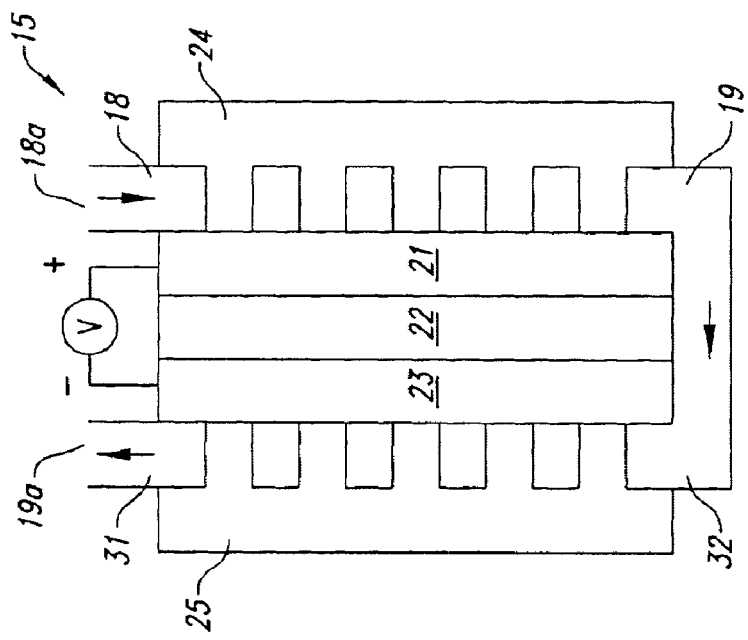
FIGS. 4a, 4b, and 4c show schematic diagrams of purification systems for use in a fuel cell system in which hydrogen from the electrolytic cell cathode is combined with the purified reformate in order to be used as fuel for the fuel cell.
Figure 4A:
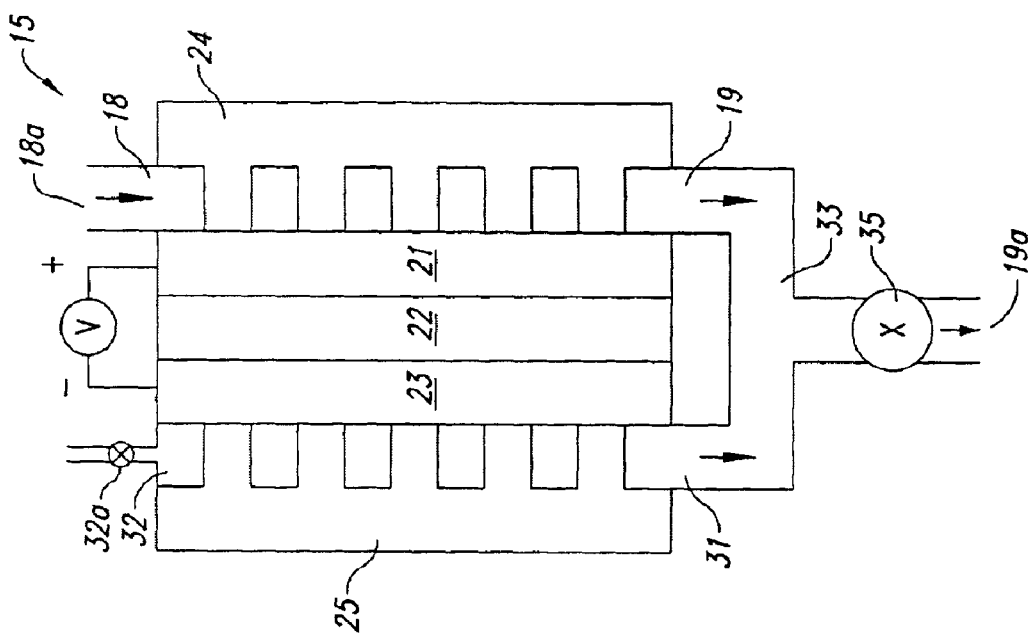
Figure 4C:
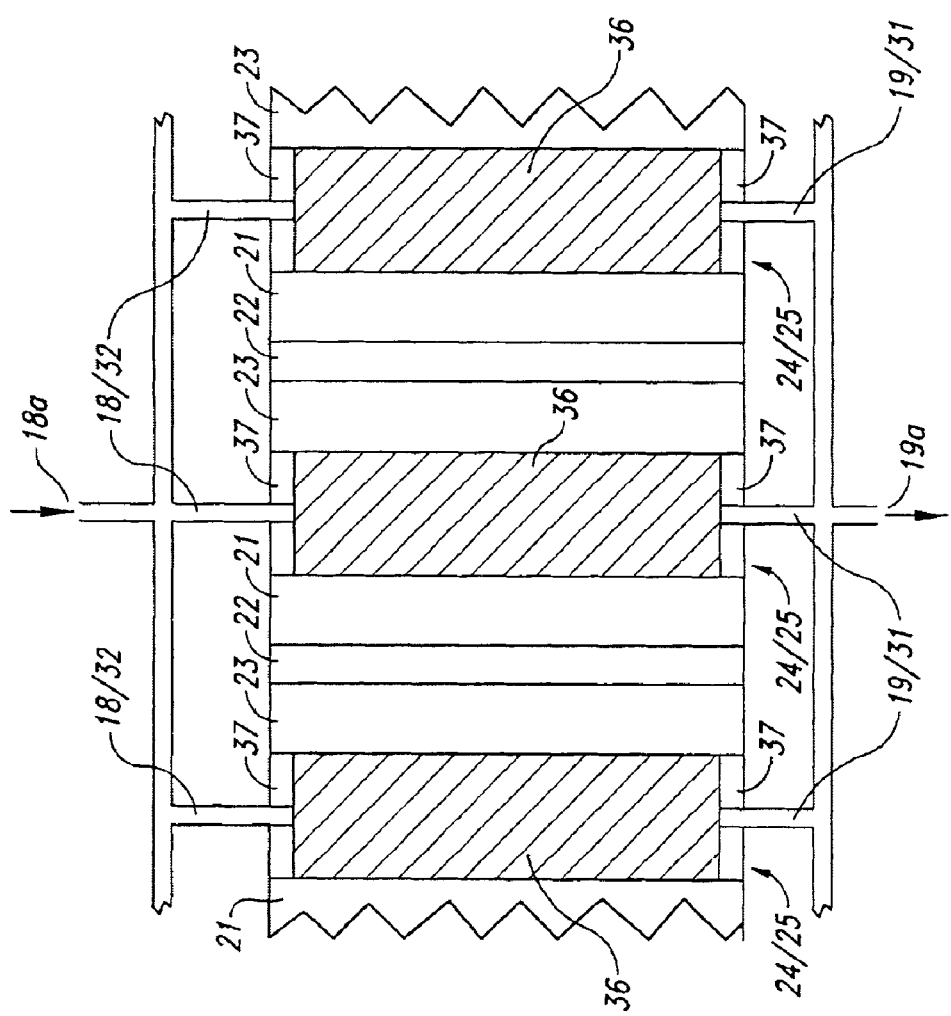

FIGS. 4a, 4b, and 4c show schematic diagrams of three possible configurations in which hydrogen from the electrolytic cell cathode may be combined with the purified reformate for use as fuel in a SPE fuel cell stack. In FIGS. 4a, 4b, and 4c, like numerals are used to denote features common to those in FIG. 3. In FIG. 4a, cathode field plate 25 is dead-ended at 32 when valve 32a is closed. Products generated or collected at cathode 23 are thus directed, via channels in flow field plate 25, out through cathode outlet port 31 and merge at junction 33 with the exhaust obtained from anode outlet port 19. The CO purified fluid is then directed from purified fuel outlet port 19a to the SPE fuel cell stack when valve 35 is open. However, a significant fluid flow occurs in the channels of anode flow field plate 24 while only a relatively small amount of fluid is generated/collected at cathode 23. Thus, in this embodiment, only a relatively small fluid flow occurs in the channels of cathode flow field plate 25 and liquid water may collect periodically in cathode 23 or the channels of cathode flow field plate 25 and interfere with operation of the electrolytic cell. Thus, means for purging cathode 23 and plate 25 may be needed to remove this water. This might be accomplished by periodically directing a suitable purging gas into anode inlet port 18, through the channels in cathode flow field plate 25 by closing valve 35, and venting it by opening valve 32a. Air is not an appropriate gas though due to the risk of combustion. Unprocessed fuel might be used if the cathode catalyst employed were not sensitive to CO poisoning (e.g., certain non noble metal catalysts). Otherwise an additional supply of purging gas may be needed. Alternatively, the purified fluid obtained from anode outlet port 19 may be employed for purging. Preferably, a continuous purging may be achieved by routing the purified fluid from anode outlet port 19 to cathode inlet port 32 as shown in FIG. 4b. Cathode product is then mixed with the anode exhaust stream as it traverses cathode flow field plate 25, thereby purging the cathode side of cell 15 before it finally exits at cathode outlet port 31 which is fluidly connected to purified fuel outlet port 19a.

Electrolytic cell 15 may require cooling to shed heat produced from the reactions therein. However, generally little current is required in order to obtain enhanced anode catalyst activity and thus relatively little heat is generated during operation. Hardware (not shown) and techniques similar to those employed in cooling SPE fuel cells may be adapted to provide cooling of electrolytic cell 15.

Again, given the similarities to SPE fuel cells, the design of the electrolytic cell with regards to the manifold and porting arrangement of the various fluids can be similar to conventional SPE cells. For instance, the electrolytic cell can comprise a series of stacked flow field plates with suitable ports and channels formed therein for fluid distribution. The number of ports can be reduced by adopting the fluid flow configuration of FIG. 4b (since the anode flow field outlet port is connected to and thus is shared with the cathode flow field inlet port).

The electrolytic cell in the purification system can be attached to the SPE fuel cell stack. Power to operate the electrolytic cell may be obtained from a starter battery during a warming up period and then from the SPE fuel cell stack itself.

The purification system is sized in accordance with the fuel flow rate needed to supply the SPE fuel cell stack. To provide a sufficiently large electrode area, the electrolytic cell in the purification system may consist of a stack of unit cells similar to that shown in FIG. 3. A parallel and/or series stack may be employed. A simple series stack construction employing porous bipolar flow field plates is shown in FIG. 4c. By employing porous flow field plates, the stack of cells in FIG. 4c operates in much the same way as the cell shown in FIG. 4a except that the function of certain components can be combined, thus requiring fewer components. For instance, bipolar plate 24/25 performs the same function as an assembly of anode flow field plate 24 and cathode flow field plate 25 shown in FIG. 4a. Each plate 24/25 comprises a porous region 36 and sealing regions 37. Porous region 36 allows fluid to access both an anode 21 of one cell in the stack and the cathode 23 of an adjacent cell in the stack. Sealing regions 37 prevent reformate from leaking into the atmosphere and vice versa. Thus, an inlet 18/32 to a bipolar plate 24/25 effectively serves as an inlet to the flow fields of both an anode and a cathode. In a like manner, an outlet 19/31 from a bipolar plate 24/25 serves as an outlet from the flow fields of both an anode and a cathode. Since fluid may escape from the cathodes 23 through porous regions 36, a buildup of water may be avoided and thus additional components may not be needed for purposes of periodic purging (e.g., such as valve 32 a in FIG. 4a).

The following examples illustrate certain embodiments and aspects of the invention. However, these examples should not be construed as limiting in any way.

EXAMPLES

Various membrane electrode assemblies (MEAs) were prepared comprising different anode catalysts, electrocatalysts, and configurations. Electrolytic cells were made and operated with each MEA to test for enhanced activity of the catalyst.

Figure 5A:
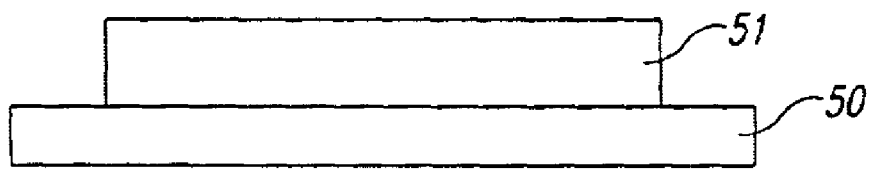
FIGS. 5a and 5b show schematic diagrams of the anode constructions evaluated in the Examples.
Figure 5B:
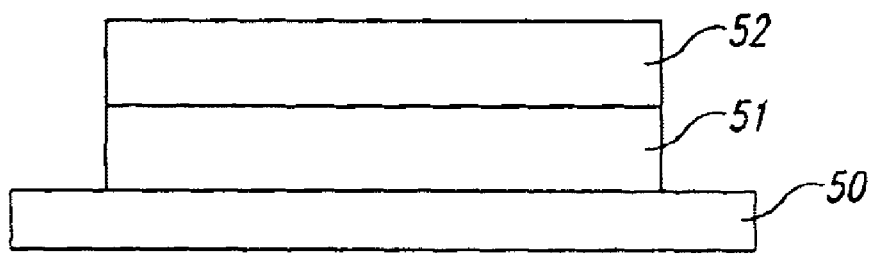

Cell construction was generally similar to that shown in FIG. 3. Perfluorosulfonic acid polymer membranes were used as the electrolyte. Anodes and cathodes were about 300 $cm^2$ in area and employed carbon fiber paper substrates. A carbon-only layer (about 0.4 $mg/cm^2$) was applied to the cathode substrates first, followed by a cathode electrocatalyst layer which comprised carbon supported platinum (at a loading about 0.8 mg $Pt/cm^2$) mixed with Nafion™ ionomer. However, as shown schematically in FIGS. 5a and 5b, the anodes had no carbon-only layer applied but did have either a bilayer (an electrocatalyst layer and a catalyst layer) construction (as shown in FIG. 5b) in which a 1 st layer 51 was applied to a substrate 50 and then a second layer 52 was subsequently applied to the 1st layer 51 in a separate application step, or a monolayer (a combined electrocatalyst and catalyst layer) construction (as shown in FIG. 5a) in which only one layer 51 was applied to the substrate 50 in a single application step. The following table provides details of the compositions of the five anodes tested. In the table, Pt on C and Pt/Ru on C refer to Pt and Pt/Ru (in a 2/1 Pt/Ru ratio by weight) compositions supported on carbon particulates. The Pt loadings of the anode electrocatalyst and catalyst were in a range from about 0.1 to 0.3 $mg/cm^2$. In some cases, a single material composition served as both a catalyst and an electrocatalyst. In the Table, PTFE stands for polytetrafluoroethylene added as a binder. Where Nafion™ or PTFE additives were used, the amounts were typically about 15% by weight. MEA fabrication was completed by hot press bonding a cathode, membrane electrolyte, and anode together at 25,000 pounds for 2 minutes at about 180° C.

| Anode | Construction | 1st layer (applied to substrate) | 2nd layer (applied to 1st layer) |
|---|---|---|---|
| A | monolayer | Pt/Ru on C + Nafion ™ | NA |
| B | monolayer | Pt/Ru on C + PTFE | NA |
| C | monolayer | Pt on C + Nafion ™ | NA |
| D | bilayer | Pt on C + PTFE | Pt/Ru on C + Nafion ™ |
| E | bilayer | Pt on C + PTFE | Pt on C + PTFE |

Each electrolytic cell was connected to a power supply and a gas mixture comprising 1% CO and 2.5% air (i.e., 0.5% oxygen) in either nitrogen or hydrogen was supplied to the anode. Pure hydrogen was supplied to the cathode such that it could serve as a stable reference electrode. A gas chromatograph was used to analyze the gas compositions, and thus to quantify the amount of CO, entering and leaving the anode. The current passed through the electrolytic cell was also monitored with time. With these measurements, the maximum rate of CO oxidation attributable to electrochemical reactions can be calculated. Initially, with no current passing, the conventional (unenhanced) rate of CO oxidation attributable to chemical reactions was determined.

Two enhancement-related parameters were determined in each test. The rate enhancement ratio, $\rho$, is given by $r/r_0$ where r is the total CO oxidation rate (including chemical and electrochemical oxidation) with an applied voltage/current and $r_0$ is the total CO oxidation in the absence of an applied voltage/current. ($r_0$ was determined after stable conditions were obtained and thus the measured CO oxidation rate does not represent mere CO adsorption on the surface of the anode catalysts.) The enhancement factor, $\Lambda$, is given by $(r-r_0)/(I/nF)$ where $(r-r_0)$ is the change in total CO oxidation rate resulting from the application of current I and (I/nF) is the CO oxidation rate attributable to electrochemical reaction. In the following it was assumed that all the applied current was consumed in oxidizing CO (i.e., in reaction 3)). Since current may have been consumed in other reactions to some extent instead, the computation of enhancement factor $\Lambda$ represents a minimum value for the actual value. It is inferred that the activity of the catalysts in the tested anode has been enhanced when $|\Lambda|>1$.

The electrolytic cell with anode A was supplied with 1% CO/2.5% air in nitrogen at 2 slpm flow rate. With a voltage of 0.6 V applied to the cell, the current I was 1.7 A and the concentration of CO was reduced to 0.001%. In this case, $\rho=1.8$ and $\Lambda=0.32$ implying no enhanced activity of the anode catalyst. This cell was supplied with 1% CO/2.5% air in hydrogen at the same flow rate and was tested in the same manner. However, a large hydrogen oxidation current masked any measured effects.

In a like manner, electrolytic cells with anodes B, C, and E also were tested but did not show enhancement of the anode catalyst activity.

However, when the electrolytic cell with anode D was tested in the same manner (i.e., supplied with 1% CO/2.5% air in nitrogen at 2 slpm flow rate and an applied voltage of 0.6 V), the current I was 0.77 A and the concentration of CO was reduced to 1.6 ppm. In this case, $\rho=15$ and $\Lambda=2.5$ implying a significant enhancement in catalyst activity. The electrolytic cell was tested further with a gas flow rate of 6 slpm, again at 0.6 V. The current I here was 0.2 A and the concentration of CO was reduced to 0.026%. Here, $\rho=45$ and $\Lambda=40$ signifying a catalytic activity 40 times larger than the electrochemical reaction rate. Further, it was found that the potential across the cell could be maintained by replacing the power supply with a load. This demonstrates that an external voltage/current does not have to be continuously applied to achieve the enhanced catalyst activity. An additional experiment was performed using this electrolytic cell and a 2 slpm flow rate where a current of approximately a few amperes was applied for a few seconds to obtain a voltage across the cell of more than 0.6 V. The current was then interrupted and the cell potential stabilized at 0.53 V. The CO concentration was reduced to 0.001%. Again, this demonstrates that an external voltage/current does not have to be continuously applied to achieve an enhanced catalyst activity.

All of the above U.S. patents, U.S. patent application publications, U.S. patent applications, foreign patents, foreign patent applications and non-patent publications referred to in this specification and/or listed in the Application Data Sheet, are incorporated herein by reference, in their entirety.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A purification system for a fluid supply comprising a major component and an oxidizable impurity, said system comprising:

an electrolytic cell comprising
a fluid diffusion anode comprising a catalyst and an electrocatalyst,
a fluid diffusion cathode, an electrolyte,
a fluid supply inlet port fluidly connected to the inlet of said anode, and
a purified fluid outlet port fluidly connected to the outlet of said anode;
a supply of oxidant fluidly connected to said fluid supply inlet port; and
a power supply with positive and negative terminals electrically connected to said anode and cathode respectively.

2. The purification system of claim 1 wherein said electrolytic cell is a solid polymer electrolyte electrolytic cell.

3. The purification system of claim 2 wherein said electrolyte is perfluorosulfonic acid ionomer.

4. The purification system of claim 2 wherein said anode comprises a substrate, a catalyst layer comprising said catalyst applied on said substrate, and an electrocatalyst layer comprising said electrocatalyst applied on said catalyst layer.

5. The purification system of claim 4 wherein said electrocatalyst layer comprises carbon supported platinum-ruthenium catalyst and perfluorosulfonic acid ionomer.

6. The purification system of claim 4 wherein said catalyst layer comprises carbon supported platinum catalyst and polytetrafluoroethylene binder.

7. The purification system of claim 4 wherein said substrate comprises non woven carbon fibre paper.

8. The purification system of claim 2 wherein said catalyst and said electrocatalyst are the same.

9. The purification system of claim 1 wherein the power supply voltage is set at greater than about 0.6 volts.

10. The purification system of claim 1 wherein said major component comprises gaseous hydrogen.

11. The purification system of claim 10 wherein said oxidizable impurity is carbon monoxide.

12. The purification system of claim 10 wherein said oxidizable impurity is methanol.

13. The purification system of claim 10 wherein said fluid supply additionally comprises water.

14. The purification system of claim 1 additionally comprising a fluid connection between the outlet of said cathode and said purified fluid outlet port.

15. The purification system of claim 14 wherein said anode outlet is fluidly connected to the inlet of said cathode and said cathode outlet is fluidly connected to said purified fluid outlet port.

16. The purification system of claim 14 additionally comprising a purge valve fluidly connected to said cathode.

17. The purification system of claim 1 wherein said system comprises a plurality of electrolytic cells in a series stack.

18. The purification system of claim 17 wherein said plurality of electrolytic cells comprises porous bipolar flow field plates.

19. A fuel cell system comprising a fuel cell and the purification system of claim 1 wherein said major component is a fuel, said fluid supply is a fuel supply that is fluidly connected to said fluid supply inlet port, and said purified fluid outlet port is fluidly connected to the fuel inlet of said fuel cell.

20. An electrolytic cell for purifying a fluid comprising an oxidizable impurity; said electrolytic cell comprising a fluid diffusion anode, a fluid diffusion cathode, a solid polymer electrolyte, a fluid supply inlet port fluidly connected to the inlet of said anode, and a purified fluid outlet port fluidly connected to the outlet of said anode, wherein said anode comprises:

a substrate;
a catalyst layer comprising carbon supported platinum catalyst and polytetrafluoroethylene binder applied on said substrate; and a
an electrocatalyst layer comprising carbon supported platinum-ruthenium catalyst and perfluorosulfonic acid ionomer applied on said catalyst layer.

21. A method for purifying a fluid using an electrolytic cell, said fluid comprising a major component and an oxidizable impurity, said electrolytic cell comprising a fluid diffusion anode comprising a catalyst and an electrocatalyst, a fluid diffusion cathode, and an electrolyte, said method comprising:

directing said fluid and an amount of oxidant to the inlet of said anode;
applying an electric potential across said electrolytic cell such that said anode is positive with respect to said cathode;
collecting purified fluid from the outlet of said anode.

22. The method of claim 21 wherein said major component is hydrogen.

23. The method of claim 22 wherein said oxidizable impurity is carbon monoxide.

24. The method of claim 23 wherein said fluid comprises less than about 1% carbon monoxide.

25. The method of claim 22 wherein said oxidant is oxygen.

26. The method of claim 25 wherein the amount of oxygen directed to said anode inlet is less than about 0.5% of the volume of said fluid.

27. The method of claim 22 wherein said oxidizable impurity is methanol.

28. The method of claim 22 wherein said fluid additionally comprises water.

29. The method of claim 22 wherein hydrogen gas is generated electrochemically at the cathode and is collected from the outlet of said cathode and combined with the purified hydrogen collected from said anode outlet.

30. The method of claim 22 wherein said electrocatalyst comprises carbon supported platinum-ruthenium and said catalyst comprises carbon supported platinum.

31. The method of claim 21 wherein said electric potential is greater than about 0.6V.

32. The method of claim 21 wherein said electric potential is applied continuously.

33. The method of claim 21 wherein said electric potential is applied periodically.

34. The method of claim 33 wherein said electric potential is applied for periods greater than 100 seconds.

35. The method of claim 33 wherein a load is applied across said electrolytic cell between applications of said electric potential.

36. The method of claim 21 wherein said electrocatalyst is ionically connected to said electrolyte.

37. The method of claim 21 wherein said electrocatalyst and said catalyst are the same.

38. The method of claim 21 comprising operating said electrolytic cell at a temperature less than about 80° C.

39. The method of claim 21 wherein the reaction rate of said oxidizable impurity at said catalyst is increased by said application of electric potential.

* * * * *